United States Patent [19]

Emura et al.

[11] Patent Number: 4,759,080

[45] Date of Patent: Jul. 19, 1988

[54] COHERENT OPTICAL COMMUNICATION SYSTEM WITH FSK HETERODYNE OR HOMODYNE DETECTION AND LITTLE INFLUENCE BY DISTORTION OF A MODULATED OPTICAL SIGNAL

[75] Inventors: Katsumi Emura; Minoru Shikada, both of Tokyo, Japan

[73] Assignee: NEC Corporation, Tokyo, Japan

[21] Appl. No.: 671,364

[22] Filed: Nov. 14, 1984

[30] Foreign Application Priority Data

Nov. 16, 1983 [JP] Japan .................................. 58-215576
Dec. 27, 1983 [JP] Japan .................................. 58-250132
Dec. 28, 1983 [JP] Japan .................................. 58-247031
Dec. 29, 1983 [JP] Japan .................................. 58-246766

[51] Int. Cl.$^4$ ............................................. H04B 9/00
[52] U.S. Cl. ......................................... 455/617; 375/88; 375/91; 455/608; 455/611; 455/619
[58] Field of Search ............... 455/611, 615, 617, 619, 455/609, 608, 613, 618; 375/88, 89, 91, 45, 90, 47; 372/26, 29, 30, 31, 34, 38

[56] References Cited

U.S. PATENT DOCUMENTS

| | | | |
|---|---|---|---|
| 3,383,600 | 5/1968 | Calfee | 375/91 |
| 3,699,445 | 10/1972 | Kinsel | 455/611 |
| 4,009,385 | 2/1977 | Sell | 372/31 |
| 4,149,071 | 4/1979 | Nagai et al. | 455/618 |
| 4,443,890 | 4/1984 | Gomurian | 455/613 |
| 4,533,874 | 8/1985 | Fischer | 375/88 |

FOREIGN PATENT DOCUMENTS 1540617 2/1979 United Kingdom ................. 455/608

OTHER PUBLICATIONS

Favre–"Future Heterodyne-Type"–European Conf on Optical Comm., Sep. 8-11, 1981-Copenhagen, Denmark–4 pages.
Takasaki et al.–"Line Coding Plans"–Conf. Rec., vol. II, Intern. Conf. on Comm., San Francisco, Calif.-Jun. 16-18, 1975, pp. 32-20-32-24.
Saito et al., "S/N and Error Rate Evaluation for an Optical FSK-Heterodyne Detection System Using Semiconductor Lasers", IEEE Journal of Quantum Electronics, vol. QE-19, No. 2 (Feb. 1983), pp. 180-193.
Yamamoto, Yoshihisa, IEEE Journal of Quantum Electronics, "Receiver Performance Evaluation of Various Optical Modulation-Demodulation Systems in the 0.5-10 m Wavelength Region", vol. QE-16, No. 11, Nov. 1980, pp. 1251-1259.

Primary Examiner—Robert L. Griffin
Assistant Examiner—L. Van Beek
Attorney, Agent, or Firm—Foley & Lardner, Schwartz, Jeffery, Schwaab, Mack, Blumenthal & Evans

[57] ABSTRACT

A laser (21) is frequency modulated by an electrical modulating signal of a bit rate into a modulated signal of a first and a second modulated frequency. A combination of an optical mixer (27) and an optical detector (31) carries out optical heterodyne or homodyne detection on the modulated optical signal to produce a detected signal having a first and a second frequency component. A component separator (32) is for selecting only one of the components from the detected signal. A detector (33) detects the selected component to produce a demodulated electrical signal representative of the modulating signal. The laser is preferably a semiconductor laser. More preferably, the semiconductor laser is frequency modulated after the modulating signal is converted to a current of an mBnB code sequence. When the bit rate is below and above about 10 Mbit/second, either the modulating signal or the mBnB code sequence current is preferably used in frequency modulating the semiconductor laser after caused to pass through a high-pass and a low-pass filter, respectively.

18 Claims, 6 Drawing Sheets

COHERENT OPTICAL COMMUNICATION SYSTEM WITH FSK HETERODYNE OR HOMODYNE DETECTION AND LITTLE INFLUENCE BY DISTORTION OF A MODULATED OPTICAL SIGNAL

BACKGROUND OF THE INVENTION

This invention relates to a coherent optical communication system in which a laser is used as an optical source.

In a transmitter of the optical communication system, a laser is used as a transmitter optical source for generating an optical carrier signal of a carrier frequency. The carrier signal is modulated into a modulated optical signal by an electrical modulating signal which usually varies as a binary signal between binary one and zero levels or mark and space levels at a modulating frequency, namely, at a bit rate, selected typically between ten kilobits and ten gigabits per second in compliance with the number of information channels carried by the modulating signal, In such an optical communication system, optical heterodyne or homodyne detection provides a high reception sensitivity which is ten to one hundred times as high as that achieved by direct optical detection. On carrying out the optical heterodyne or homodyne detection, the optical carrier signal is modulated in accordance with amplitude shift keying (ASK), frequency shift keying (FSK), or phase shift keying (PSK).

As will readily be understood, a receiver of the optical communication system comprises a local optical source for generating a local optical signal of a local oscillation frequency predetermined in compliance with one of the optical heterodyne and the optical homodyne detection techniques that should be carried out. An optical mixer is for mixing the local optical signal and the modulated optical signal which is received through an optical path from the transmitter. The mixer thereby produces a mixed optical signal. A demodulator demodulates the mixed optical signal into a demodulated electrical signal which represents the modulating signal.

When the amplitude shift keying is resorted to, the requisites are not strict as regards the spectral width and the frequency stability of the optical carrier signal. The transmitter may therefore be of a simple structure. The modulated optical signal, however, has a reduced output power when the optical heterodyne or homodyne detection is additionally used, with a semiconductor laser used as the transmitter optical source. This is because the semiconductor laser must be modulated by the use of an external modulator which inevitably gives rise to an insertion loss to reduce the output power. It may be mentioned here that a semiconductor laser can directly be intensity modulated by varying the injection current thereof in accordance with the modulating signal. In this event, the carrier frequency unavoidably varies with the injection current. This is the reason why the external modulator is necessary under the circumstances.

For the frequency shift keying, it is possible to directly frequency modulate a semiconductor laser by varying the injection current in compliance with the modulating signal. Furthermore, the reception sensitivity is theoretically raised 3 dB as compared with that achieved by the optical heterodyne or homodyne reception with the amplitude shift keying. The requisites are, however, strict for the spectral width and the frequency stability. The present-day semiconductor lasers are not all satisfactory for these requisites. When the requisites are not satisfied, the reception sensitivity is adversely affected. The injection current varied with the modulating signal, will be called a modulating current merely for convenience of the following description.

It is already reported as will later be described more in detail that a frequency shift per unit modulating current is dependent on the modulation frequency when the direct frequency modulation is resorted to. As a consequence, the modulated optical signal is not only frequency modulated but also intensity modulated. This eventually results in a distortion of the demodulated electrical signal.

SUMMARY OF THE INVENTION

It is therefore a principal object of the present invention to provide a coherent optical communication system in which a narrow spectral width need not be had by an optical carrier signal generated by a laser used as a transmitter optical source.

It is another principal object of this invention to provide an optical communication system of the type described, in which optical heterodyne or homodyne detection is carried out with as high a reception sensitivity as that achieved by the optical heterodyne or homodyne used in combination with amplitude shift keying.

It is still another principal object of this invention to provide an optical communication system of the type described, in which the laser is directly frequency modulated according to frequency shift keying.

It is a subordinate object of this invention to provide an optical communication system of the type described, which is capable of providing a demodulated electrical signal with little distortion.

Other objects of this invention will become clear as the description proceeds.

An optical communication system to which this invention is applicable, comprises a transmitter, a receiver, and an optical path between the transmitter and the receiver. The transmitter comprises a laser for generating an optical carrier signal of a carrier frequency and modulating means for frequency modulating the carrier signal by an electrical modulating signal into a modulated optical signal for transmission to the optical path. The receiver comprises a local optical source for generating a local optical signal of a local oscillation frequency predetermined in consideration of the carrier frequency, an optical mixer for mixing the local optical signal and the modulated optical signal received through the optical path to produce a mixed optical signal, and demodulating means for demodulating the mixed optical signal into a demodulated electrical signal representative of the modulating signal. According to this invention, the modulating means is for making the modulated optical signal take a first and a second modulated frequency in compliance with the modulating signal so that the mixer makes the mixed optical signal essentially consist of first and second frequency components corresponding to the first and the second modulated frequencies, respectively. The demodulating means comprises first means for separating the first frequency component from the mixed optical signal and second means for demodulating the first frequency component separated by the first means to produce the demodulated electrical signal.

BRIEF DESCRIPTION OF THE DRAWING

FIG. 1, is a schematic diagram of a conventional circuit comprising a semiconductor laser and a modulating circuit therefor;

FIG. 12, shows deteriorations caused in a reception sensitivity by an electrical modulating signal of mB(m+1)B codes for various values of m;

DESCRIPTION OF THE PREFERRED EMBODIMENTS

Figure 1:
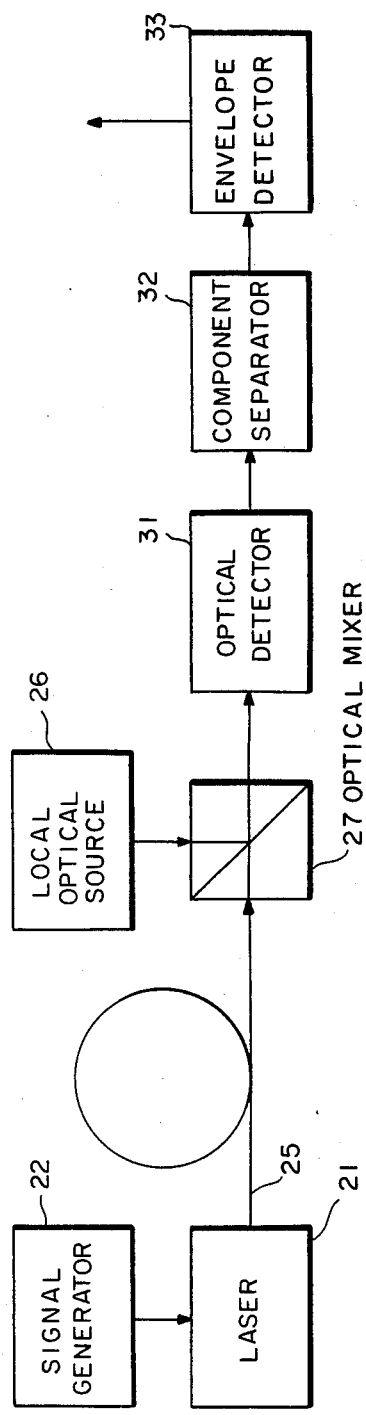
FIG. 1 is a block diagram of a coherent optical communication system according to a first embodiment of the instant invention.

Referring to FIG. 1, a coherent optical communication system according to a first embodiment of the present invention comprises a laser 21 used as a transmitter optical source. The laser 21 generates an optical carrier signal of a carrier frequency. A signal generator 22 is for producing an electrical modulating signal which takes, as a binary signal, binary one and zero levels or mark and space levels at a modulation frequency, namely, at a bit rate which will be discussed more in detail in the following. The modulating signal is delivered to the laser 21 to frequency modulate the carrier signal into a modulated optical signal by frequency shift keying in the manner which will become clear as the description proceeds. The modulated optical signal is transmitted to an optical path 25. It is now understood that a transmitter of the communication system comprises the laser 21 and the signal generator 22.

A local optical source 26 is for generating a local optical signal of a local oscillation frequency predetermined in consideration of the carrier frequency in the manner which will presently become clear. An optical mixer 27 is for optically mixing the local optical signal and the modulated optical signal received through the optical path 25. A receiver of the communication system comprises an optical detector 31 for detecting the mixed optical signal to produce a detected signal. It is possible to understand that the local optical source 26 and the mixer 27 are included in the receiver.

Figure 2:
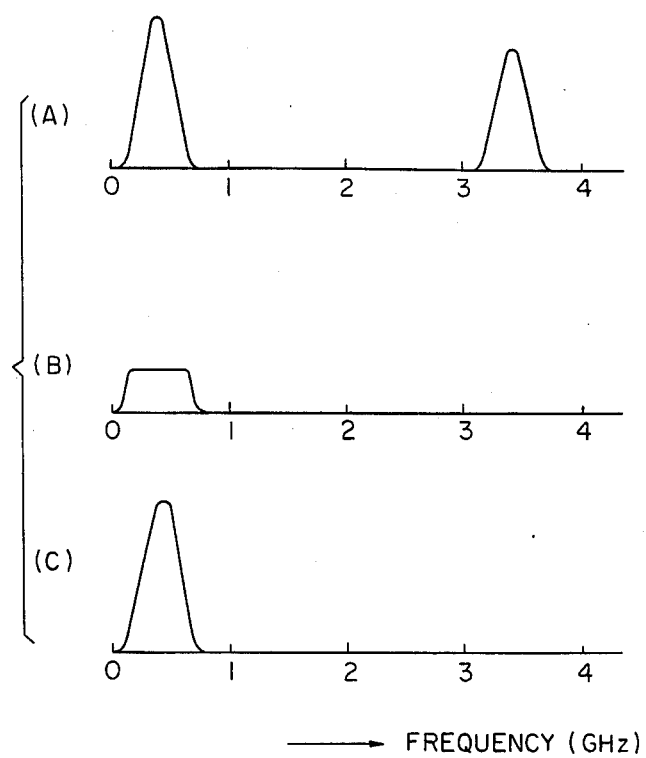
FIGS. 2 (A), (B), and (C) show frequency characteristics of a modulated optical signal, a component separator, and a separated frequency component for use in describing principles of operation of the system depicted in FIG. 1.
Figure 3:
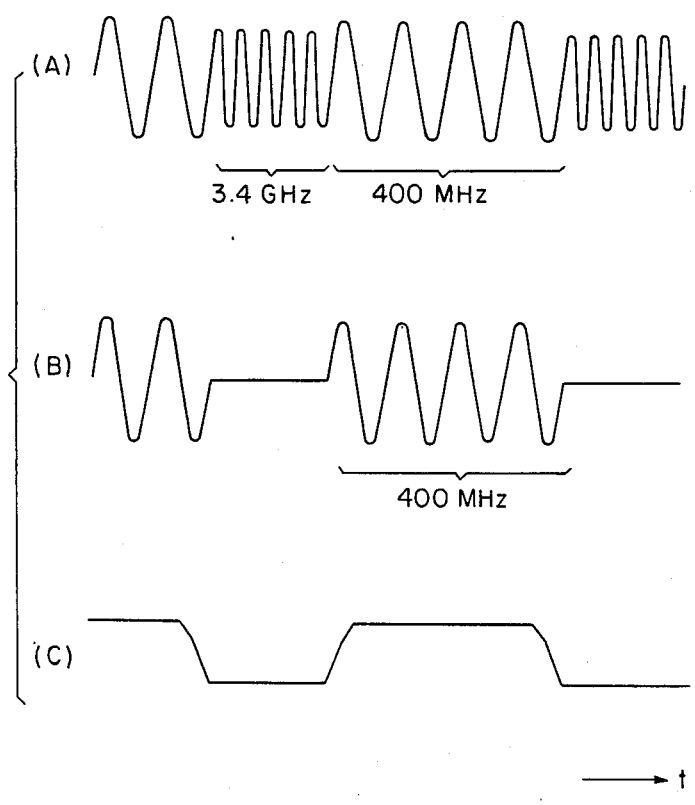
FIGS. 3 (A), (B), and (C) schematically show waveforms of a mixed optical signal, the separated frequency component, and a demodulated electrical signal.

Turning to FIGS. 2 and 3 for a short while, such a semiconductor laser was used in an example of the communication system as the laser 21 (FIG. 1) that the semiconductor laser was capable of generating the optical carrier signal in a single longitudinal or axial mode. It is already known in the art that the semiconductor laser is directly frequency modulated by varing the injection current thereof as a modulating current in accordance with the modulating signal. When the modulating current was varied with a difference of 5 mA between the binary one and the binary zero levels of the modulating signal, the modulated optical signal was subjected to a frequency difference of 3 GHz. More particularly, the modulated optical signal had a first and a second modulated frequency which had the frequency difference and corresponded to the binary one and zero levels of the modulating signal, respectively. In the example being illustrated, the first modulated frequency was lower than the second modulated frequency. The optical path 25 was a single-mode optical fiber.

In the example of the communication system, another semiconductor laser was used as the local optical source 26 (FIG. 1) in making the local oscillation frequency provide a frequency shift of 400 MHz to the first modulated frequency which was of the lower frequency and corresponded to the binary one level of the modulating signal. The local oscillation frequency was controlled by an automatic frequency control (AFC) circuit (not shown). A half-silvered mirror was used as the optical mixer 27 as symbolically depicted in FIG. 1. An avalanche photodiode was used as the optical detector 31 in carrying out optical heterodyne detection of the mixed optical signal. The detected signal was an electrical beat signal which was of a frequency characteristic illustrated in FIG. 2 (A) and had a lower and a higher center frequency at 400 MHz and 3.4 GHz. The detected signal had a waveform shown in FIG. 3 (A). It is now understood that the mixed optical signal essentially consists of first and second frequency components which correspond to the first and the second modulated frequencies, respectively. The detected signal had the lower center frequency in correspondence to each first frequency component which resulted from the binary one level of the modulating signal. The detected signal had the higher center frequency at each second frequency component which resulted from the binary zero level.

Attention will now be directed to the fact that the semiconductor laser is subjected to intensity modulation to a certain extent by the modulating current. The intensity modulation gives the modulated optical signal a larger and a smaller amplitude at lower and higher frequencies, respectively. This is the reason why the detected signal has a stronger and a weaker intensity in FIG. 2 (A) and a larger and a smaller amplitude in FIG. 3 (A) at lower and higher frequencies, respectively.

Referring to FIG. 1 together with FIGS. 2 and 3, the receiver comprises a band-limited receiving circuit 32 as a component separator for separating the detected signal having one of the lower and the higher center frequencies from the other to produce a separated output signal. In the example of the communication system, the component separator 32 had a passband between 100 MHz and 700 MHz in the manner shown in FIG. 2 (B). The component separator 32 produces the detected signal of the lower center frequency as the separated output signal as depicted in FIG. 2 (C). The separated output signal had a waveform illustrated in FIG. 3 (B). An envelope detector 33 is for envelope detecting the separated output signal to produce a demodulated electrical signal representative of the modulating signal. In the example, the demodulated electrical signal had a waveform depicted in FIG. 3 (C). It is now understood that a combination of the optical detector 31 and the component separator 32 is for separating one of the first and the second frequency components from the mixed optical signal to produce the separated output signal.

In the manner thus far been described with reference to FIGS. 1 through 3, the demodulated electrical signal is obtained as amplitude or intensity information from frequency information carried by only one of the first and the second frequency components. Insofar as the frequency difference between the first and the second modulated frequencies is large, the requisites for the spectral width is not stringent as in the optical heterodyne detection with amplitude shift keying. Inasmuch as the external modulator is unnecessary in contrast to the amplitude shift keying, the reception sensitivity is high. No problem arises from the intensity modulation between the first and the second frequency components because only one thereof is used in producing the demodulated electrical signal.

In FIG. 1, the laser 21 may be a helium-neon or a like gas laser. When the laser 21 is a semiconductor laser comprising an external resonator, the frequency modulation may be carried out by varying the resonator length. An audio-optical or a similar external modulator may be combined with the laser 21. The optical path 25 may either be space or an optical propagation path. The optical mixer 31 may be a fiber coupler or a diffraction grating. The optical detector 32 may be a different photodiode or a photoelectron multiplier. A coherent detector may be used instead of the envelope detector 33. When one of the first and the second modulated frequencies is selected as the local oscillation frequency, optical homodyne detection is carried out. In this event, the demodulated electrical signal is obtained from the amplitude or intensity information which is derived from the baseband signal resulting from the optical homodyne detection.

Figure 4:
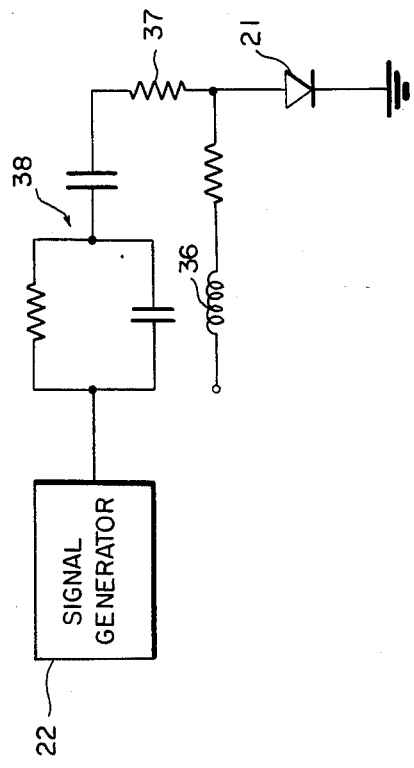
FIG. 4, drawn below

Referring now to FIG. 4, a conventional transmitter is for use in a coherent optical communication system of the type illustrated with reference to FIG. 1 and comprises a semiconductor laser 21. The transmitter is described in an article contributed by Shigeru Saito et al to IEEE Journal of Quantum Electronics, Vol. QE-19, No. 2 (February 1983), pages 180 to 193, under the title of "S/N and Error Rate Evaluation for an Optical FSK-Heterodyne Detection System Using Semiconductor Lasers." A bias current is supplied to the laser 21 through a bias circuit comprising a choke coil 36 so as to bias the laser 21 to a predetermined level which is higher than the oscillation threshold of the laser 21. The modulating signal is delivered to the laser 21 through a matching resistor 37 and a high-pass filter 38.

It may be mentioned here in connection with a semiconductor laser that the modulating current results in a variation in the carrier density in the active layer and also in a variation in the temperature of the active layer. Both variations give rise to a variation in the effective refractive index and to a frequency shift in the laser oscillation. More specifically, an increase in the carrier density brings about a decreased refractive index and lowers the oscillation frequency. A rise in the temperature brings about thermal expansion of the active layer. Components caused to the frequency shift by the carrier density variation and by the temperature variation, will be referred to herein as a first and a second variation merely for brevity of description. The first variation has a quick response to the modulating current. The second variation, however, has a slow response and results in slow build up and down of the frequency shift. It has therefore been believed that the frequency shift results in a distorted waveform which looks as if the modulating signal were supplied to the laser through an integrator. The high-pass filter 38 is for use in cancelling or reducing the distortion.

Figure 5:
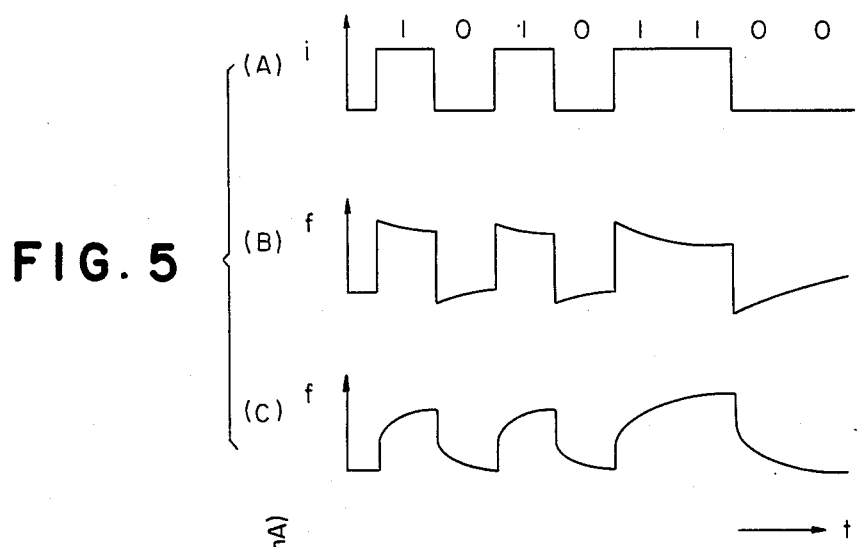
FIGS. 5 (A), (B), and (C) show waveforms of an electrical modulating signal, a distortion in the modulated optical signal, and another distortion in the modulated optical signal.
Figure 6:
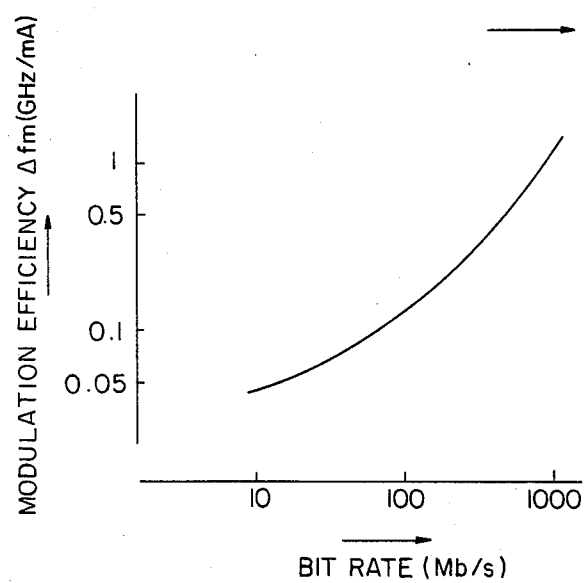
FIG. 6 shows a frequency characteristic of a frequency shift per unit modulating current for a semiconductor laser.

Turning to FIGS. 5 and 6, a binary modulating signal will be assumed to vary as depicted in FIG. 5 (A). It has now been confirmed by the inventors that the frequency shift results in a distorted waveform which looks as shown in FIG. 5 (B) as if the modulating signal were delivered to the semiconductor laser through a differentiator when the modulating signal has a high bit rate of several tens of megabits per second or higher and particularly when the semiconductor laser is of a buried heterostripe structure. It has furthermore been confirmed that the distortion results from the fact that the frequency modulation efficiency rises with the bit rate in the manner logarithmically illustrated in FIG. 6 by the modulation efficiency versus the bit rate for a bit rate range between 10 Mbit/sec and 1 Gbit/sec. The modulation efficiency is represented by a frequency shift per unit modulating current $\Delta f_m$. If the modulated optical signal of the distorted waveform were received at the receiver, the demodulated electrical signal would have a similar distortion. The distortion is quite different from what is known from the prior reports, such as the above-referenced Saito et al article, and depicted in FIG. 5 (C) for reference.

Figure 7:
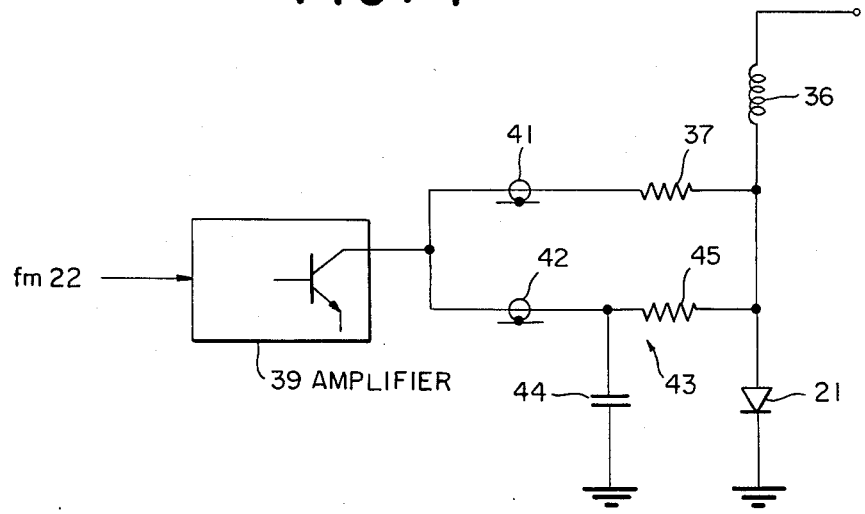
FIG. 7 is a schematic diagram of a transmitter for use in a coherent optical communication system according to a second embodiment of this invention.
Figure 8:
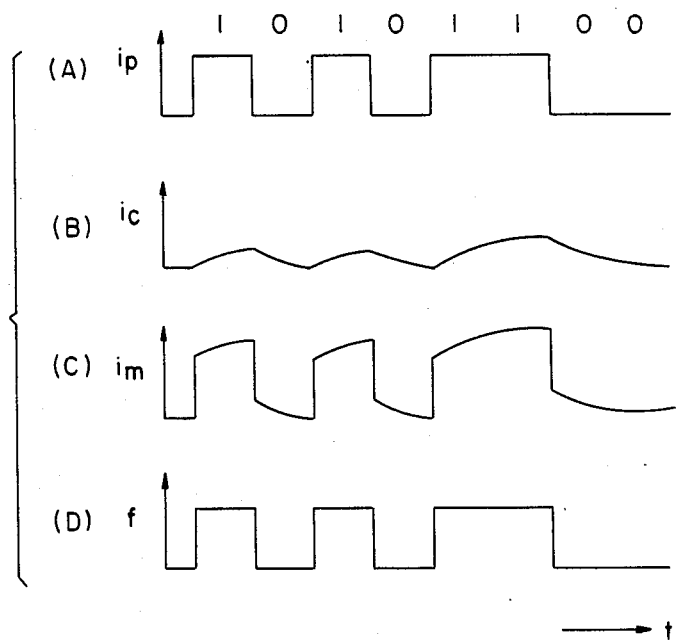
FIGS. 8 (A) through (D) show waveforms of signals at several points of the transmitter illustrated in FIG. 7.

Referring to FIGS. 7 and 8, a transmitter is for use in a coherent optical communication system according to a second embodiment of this invention. The transmitter comprises, like in FIG. 4, a semiconductor laser 21, a choke coil 36 for supplying a bias current $i_b$ to the laser 21, and a matching resistor 37 through which a rectangular modulating pulse current $i_p$ is delivered to the laser 21 with a current waveform exemplified in FIG. 8 (A). The modulating current is current-amplified by an amplifier 39 and then fed to the matching resistor 37 through a first coaxial cable 41 and to a second coaxial cable 42. In the amplifier 39, only one transistor is depicted. The depicted transistor is used as the last-stage transistor. The modulating current of the second coaxial cable 42 is delivered to the laser 21 through an integrator 43 as a distortion cancelling current $i_c$ with higher frequency components of the pulse current $i_p$ cut off into a current waveform depicted in FIG. 8 (B). The integrator 43 comprises a capacitor 44 and a resistor 45. A sum of the pulse and the cancelling currents $i_p$ and $i_c$ is supplied to the laser 21 as a compensated modulating current $i_m$ of a current waveform shown in FIG. 8 (C). The modulated optical signal has an excellent binary frequency waveform illustrated in FIG. 8 (D).

Figure 9:
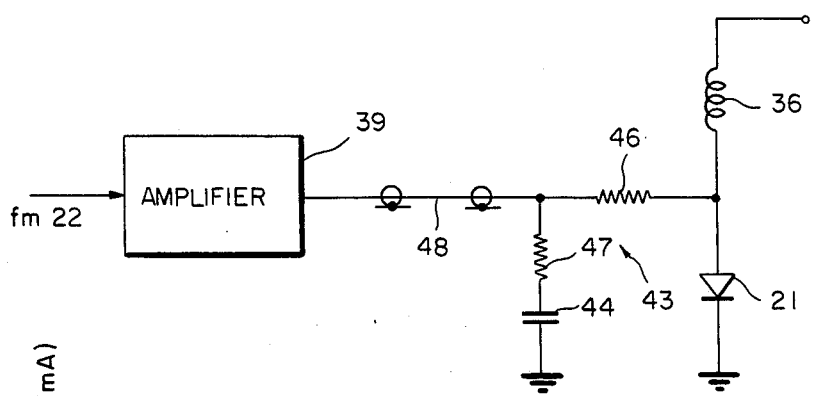
FIG. 9 is a schematic diagram of a transmitter for use in a coherent optical communication system according to a third embodiment of this invention.

Turning to FIG. 9, a transmitter is for use in a coherent optical communication system according to a third embodiment of this invention. Like in FIGS. 4 and 7, the transmitter comprises a semiconductor laser 21 and a choke coil 36 through which the bias current $i_b$ is delivered to the laser 21. An integrator 43 comprises a capacitor 44 and first and second resistors 46 and 47 and is for supplying the laser 21 with a compensated modulating current $i_m$ which is obtained by superposing a distortion cancelling current $i_c$ of the type described in conjunction with FIGS. 7 and 8 on a rectangular modulating pulse current $i_p$ produced by the amplifier 39 and led to the integrator 43 through a single coaxial cable 48. It has been confirmed that the modulated optical signal has an excellent binary frequency waveform as depicted in FIG. 8 (D).

Reviewing FIGS. 7 through 9, the integrator 43 may be an electrical circuit having the characteristics of a low-pass filter. Such an integrator may be placed prior to the amplifier 39 and may be combined with circuitry for adjusting the integration constant and/or the peak value of the distortion cancelling current $i_c$ in consideration of the conditions for operation of the semiconductor laser 21, such as the level of the bias current $i_b$, the ambient temperature, and the duty ratio of the modulating pulse current $i_p$. In the transmitter illustrated with reference to FIG. 7, the integrator 43 may be combined with the circuitry for carrying out impedance matching with the second coaxial cable 42.

Figure 10:
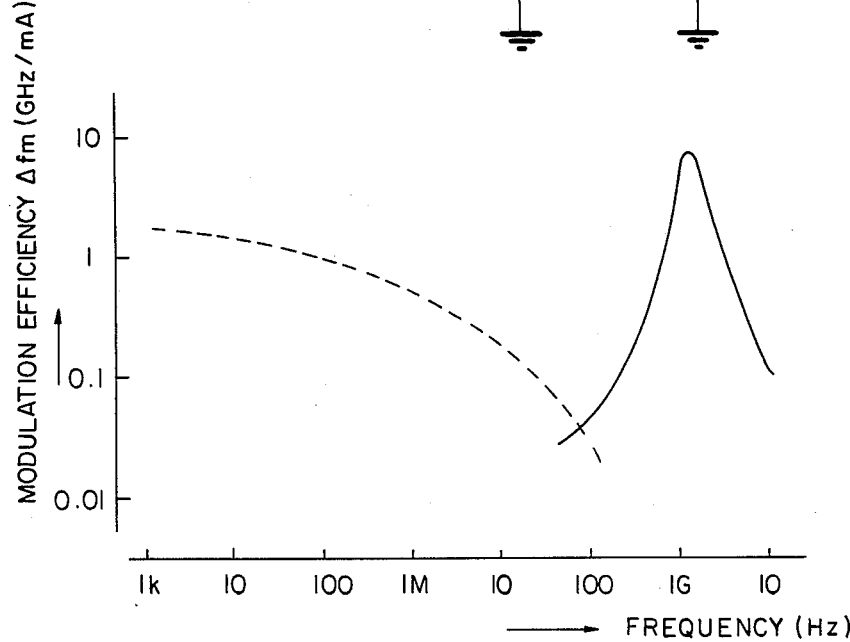
FIG. 10 shows frequency characteristics of a frequency shift per unit modulating current for a semiconductor laser of a buried heterostripe structure.
Figure 11:
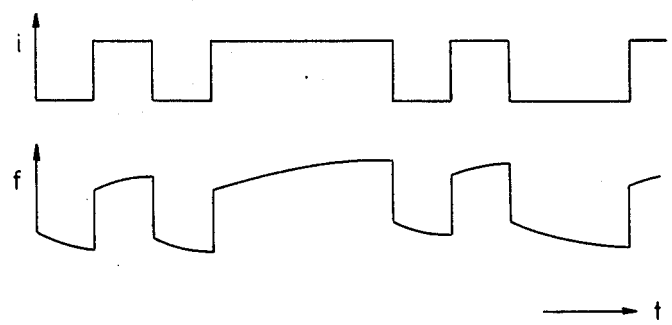
FIG. 11 shows waveforms of an electrical modulating signal and a modulated optical signal for the modulating signal of a low bit rate.
Figure 12:
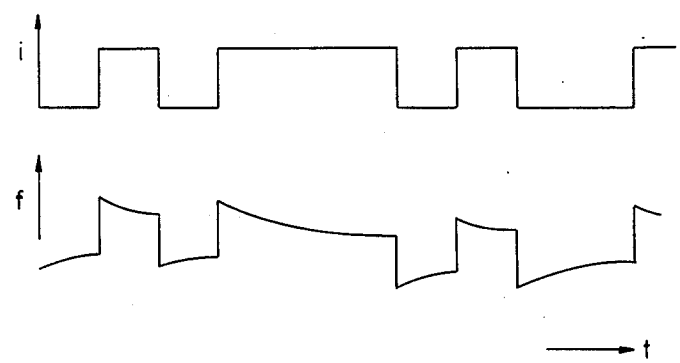
FIG. 12 shows waveforms of an electrical modulating signal and a modulated optical signal for the modulating signal of a high bit rate.

Referring now to FIGS. 10 through 12, the above-described first and second variations are dependent on the modulation frequency in the manner described in the above-cited Saito et al article as regards as AlGaAs channel-substrate planar laser and for a sinusoidal modulating current. By using a semiconductor laser of the buried heterostripe structure, the frequency dependency was observed and is depicted in FIG. 10 by a dashed-line curve for the effect of temperature rise and by a solid-line curve for the effect of variation in the carrier density. The curves show the frequency shift per unit modulating current $\Delta f_m$ versus the modulation frequency between 1 kHz and 10 GHz. The effect of temperature rise is dominant in a frequency range below about 10 MHz and is stronger at lower frequencies. The binary modulating signal depicted in the top line of FIG. 11 and having a bit rate which is about ten megabits per second or less, therefore gives the modulated optical signal a distortion which looks in the manner depicted in the bottom line of FIG. 11 as if the modulating signal were delivered to the laser through a low-pass filter. The effect of carrier density variation is dominant in a frequency range above about 100 MHz and grows stronger at higher frequencies in a range between about 100 MHz and 1 GHz. Attention will now be directed to another binary modulating signal having a bit rate between 100 megabits per second and 1 gigabits per second as shown in the top line of FIG. 12 on a time scale which is different from that used in FIG. 11. The modulating signal gives the modulated optical signal a distortion which looks as depicted in the bottom line of FIG. 12 as if the modulating signal were supplied through a high-pass filter.

Figure 13:
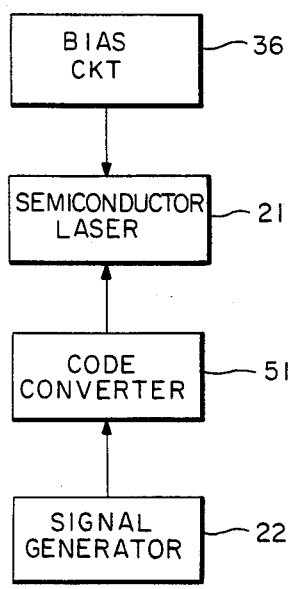
FIG. 13 is a block diagram of a transmitter for use in a coherent optical communication system according to a fourth embodiment of this invention.
Figure 14:
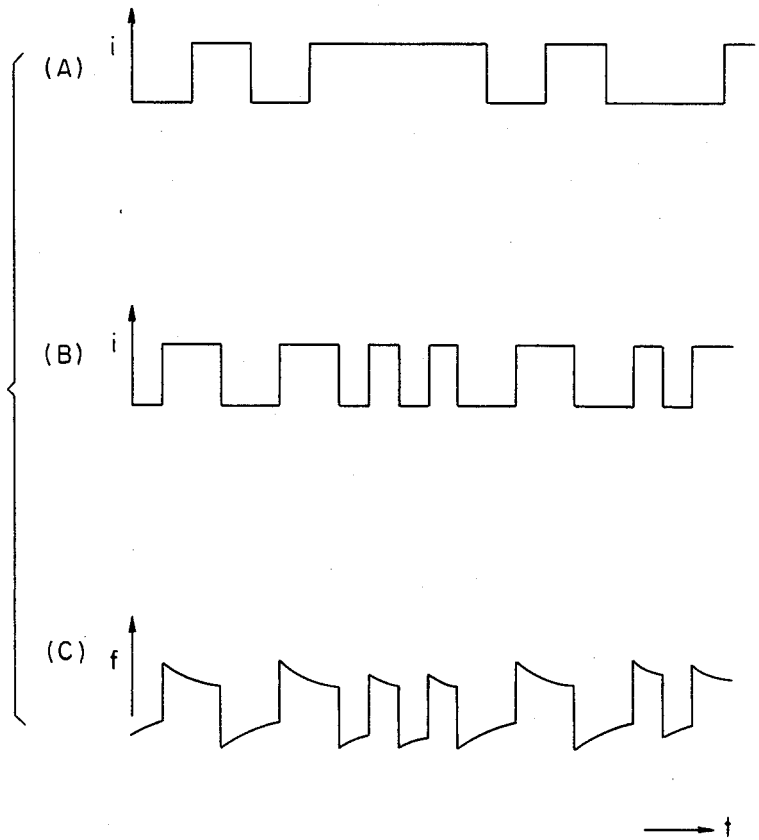
FIGS. 14 (A) through (C) show waveforms of signals at a few points of the transmitter depicted in FIG. 13.

Referring to FIGS. 13 and 14, a transmitter is shown for use in a coherent optical communication system according to a fourth embodiment of this invention. Like in FIGS. 4 and 7, the transmitter comprises a semiconductor laser 21, a signal generator 22, and a bias circuit which is exemplified by the choke coil 36 in FIGS. 4 and 7 and is herein designated by the reference numeral 36. A code converter 51 is for converting the binary modulating signal produced by the signal generator 22 and of a current waveform exemplified in FIG. 14 (A) to an electric current of the form of an mBnB code sequence where each of m and n represents a natural number, m being less than n. The electric current produced by the code converter 51 will be called an mBnB code sequence current, wherein an m-bit code of the binary modulating signal is converted to an n-bit code. The mBnB code sequence current is illustrated in FIG. 14 (B) as a biphase code current where m and n are equal to 1 and 2, respectively. More particularly, the biphase code current is obtained by converting the binary one level of the binary modulating signal to a succession of binary one and zero ("10") levels and the binary zero level to another succession of binary zero and one ("01") levels. Such an mBnB code sequence current is used in directly frequency modulating the semiconductor laser 21. The modulated optical signal has a frequency waveform depicted in FIG. 14 (C).

It should be pointed out in connection with FIGS. 10 through 14 that a stronger distortion results in the modulated optical signal as is clear from the bottom lines of FIGS. 11 and 12 when either the binary one or the binary zero level continues longer in the binary modulating signal. The mBnB code sequence current is therefore used, wherein the binary one or zero level continues at most n bits.

Figure 15:
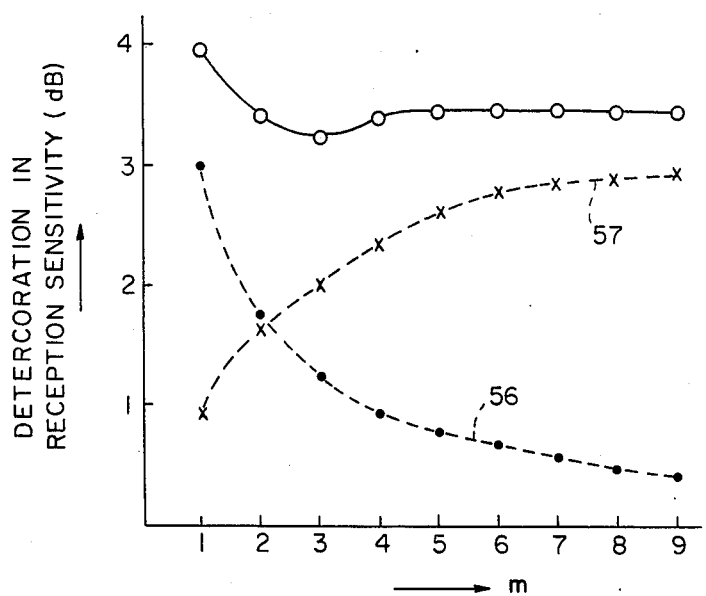
FIG. 15, depicted below

Turning to FIG. 15, a detailed consideration will be given to the distortion which remains in the frequency waveform of the modulated optical signal even when the mBnB code sequence current is used in directly frequency modulating the carrier signal generated by a semiconductor laser. The remaining waveform distortion brings about a reduction in the reception sensitivity of the modulated optical signal. The reduction will be called a waveform deterioration. Use of the mBnB code sequence current inevitably results in a broader bandwidth, which brings about a bandwidth deterioration in the reception sensitivity. A composite reduction which is caused to the reception sensitivity by the waveform and the bandwidth deteriorations, will be called an overall deterioration. The laser was a semiconductor laser of the buried heterostripe structure. The binary modulating signal had a bit rate of 400 megabits per second. An mB(m+1)B code sequence current was used with m varied between 1 and 9, both inclusive. The reduction in the reception sensitivity is plotted against the value of m.

The waveform deterioration became stronger with an increase in the value of m in the manner depicted by a dashed-line curve 56. The bandwidth deterioration was improved with an increase in the value of m as illustrated by another dashed-line curve 57. The overall deterioration had a minimum when m was equal to 3 and was not much improved when the value of m was near to 9 as will be seen from a solid-line curve. When the laser was directly frequency modulated by the binary modulating signal, the reception sensitivity was reduced 7 dB or more from a theoretical value for a modulated optical signal having no frequency waveform distortion. Furthermore, it was impossible to attain a code error rate of less than $10^{-6}$ in the demodulated electrical signal. When the biphase code current was used, the reception sensitivity was reduced 5 dB including the deterioration of 3 dB caused by twice as broad a bandwidth which resulted from conversion of the binary modulating signal to the 1B2B code sequence current. The code error rate was $10^{-9}$ or less. It has been confirmed that the tendency being illustrated, is not much different when the bit rate is above about 100 megabits per second. In view of the bandwidth, the value of n of the mBnB mode sequence current is preferably equal to either (m+1) or (m +2).

Figure 16:
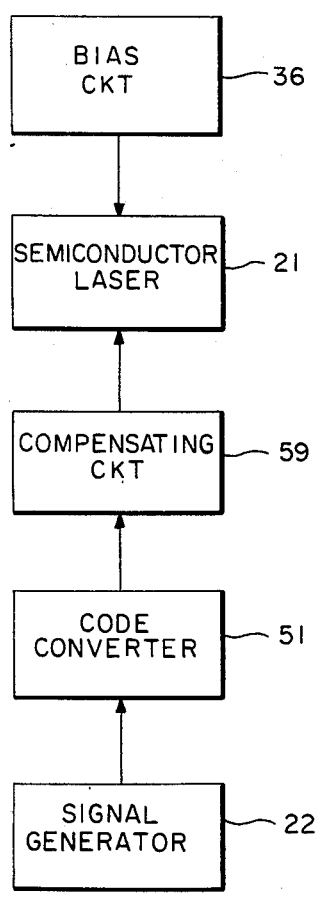
FIG. 16 is a block diagram of a transmitter for use in a coherent optical communication system according to a fifth embodiment of this invention.
Figure 17:
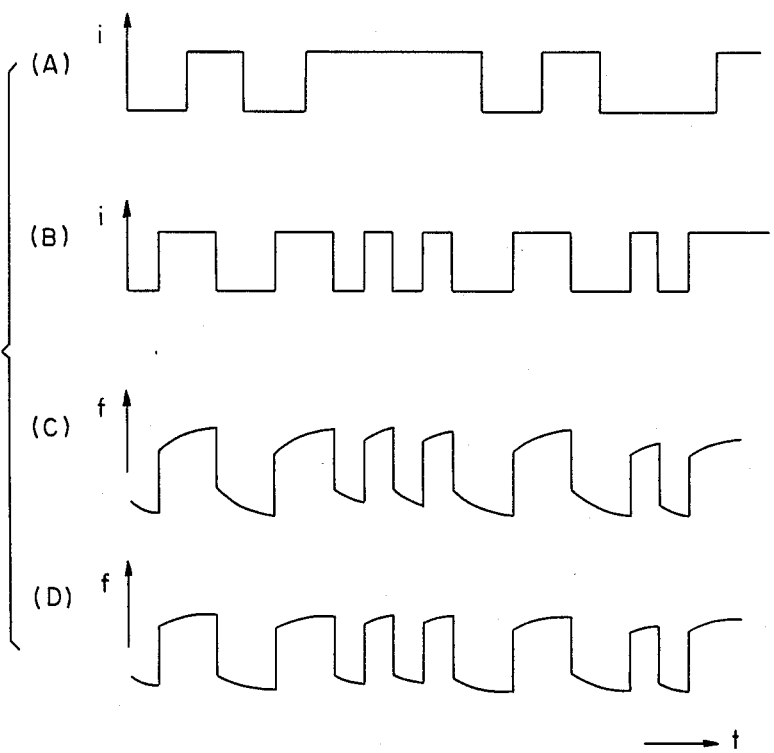
FIGS. 17 (A) through (D) show waveforms of signals at several points of the transmitter illustrated in FIG. 16.

Further turning to FIGS. 16 and 17, a transmitter is for use in a coherent optical communication system according to a fifth embodiment of this invention. The transmitter comprises similar parts designated by like reference numerals. A compensating circuit 59 is interposed between the semiconductor laser 21 and the code converter 51. Like in FIG. 13, the signal generator 22 produces a binary modulating signal of a current waveform depicted in FIG. 17 (A). The code converter 51 produces an mBnB code sequence current exemplified as the biphase code current in FIG. 17 (B). Responsive to such an mBnB code sequence current, the compensating circuit 59 superposes a distortion cancelling current on the mBnB code sequence current to produce a compensated modulating current. Depending on the bit rate of the binary modulating signal, the distortion cancelling current should have a waveform which the mBnB code sequence current has when caused to pass through either a high-pass or a low-pass filter. The compensated modulating current has a current waveform illustrated in FIG. 17 (C) when the bit rate is 400 megabits per second as before. The semiconductor laser 21 is directly frequency modulated by the compensated modulating current. The modulated optical signal has a frequency waveform depicted in FIG. 17 (D).

Reviewing FIGS. 10 through 17, the fact is already described in the above-referenced Saito et al article that the waveform distortion is striking after a sequence of only the mark signals or levels or the space levels. In addition to a PN signal, an alternate mark and space ( . . . 1010. . . ) signal is used therein in theoretically and experimentally evaluating the code error rate. On the other hand, the mBnB code sequence is already described on providing a signal sequence of a least possible power fluctuation in an article contributed by Y. Takasaki et al to IEEE Trans. COM, Vol. COM-24, No. 4 (April 1976), under the title of "Optical Pulse Formats for Fiber Optical Digital Communications." It should be noted despite the Saito et al and the Takasaki et al articles that it is novel to use either the mBnB code sequence current or the compensated modulating current derived therefrom in directly frequency modulating a semiconductor laser in enabling reception of the binary frequency modulated optical signal by the use of only one of the frequency components which are obtained by the optical heterodyne or the optical homodyne detection technique.

We claim:
1. An optical communication system comprising:
a transmitter,
a receiver,
and an optical path between said transmitter and said receiver, said transmitter comprising a laser for generating an optical carrier signal of a carrier frequency and modulating means for frequency modulating said carrier signal by an electrical modulating signal variable between a first and a second level into a modulated optical signal for transmission to said optical path, said receiver comprising a local optical source for generating a local optical signal of a local oscillation frequency predetermined in consideration of said carrier frequency, optical mixing means for mixing said local optical signal and the modulated optical signal received through said optical path to produce a mixed electrical signal, and demodulating means for demodulating said mixed electrical signal into a demodulated electrical signal representative of said electrical modulating signal, wherein said modulating means modulates said carrier signal with said electrical modulating signal to produce said modulated optical signal having a first and a second frequency in compliance with said first and second levels of said electrical modulating signals, said first and second frequencies having a frequency difference which is wider than a spectral width of said optical carrier signal, said mixing means mixing said local optical signal and said modulated optical signal to produce said mixed electrical signal having a first, lower and a second, higher frequency components corresponding to said first and said second frequencies, respectively, said demodulating means comprising first means for separating only said first, lower frequency component from said mixed electrical signal and second means for demodulating only the first, lower frequency component separated by said first means to produce said demodulated electrical signal, said receiver not demodulating said second, higher frequency component.

2. An optical communication system as claimed in claim 1, wherein said laser comprises a semiconductor laser, said modulating signal comprises a binary modulating signal, wherein said modulating means comprises means for directly frequency modulating said carrier signal by said binary modulating signal.

3. An optical communication system as claimed in claim 1, wherein said laser comprises a semiconductor laser, said modulating signal comprises a binary modulating current, said modulated optical signal is an FSK modulated optical signal and said modulating means comprises:

means responsive to said binary modulating current for superposing a distortion cancelling current on said binary modulating current to produce a compensated modulating current, said distortion cancelling current having a waveform which said binary modulating current has when passed through a low-pass filter, said distortion cancelling current cancelling a distortion which would otherwise appear in said FSK modulated optical signal; and means for directly frequency modulating said carrier signal by said compensated modulating current.

4. An optical communication system as claimed in claim 1, wherein said laser comprises a semiconductor laser supplied with a d.c. bias, said modulating signal comprises a binary modulating signal, said modulated optical signal is an FSK modulated optical signal, and said modulating means comprises:

code converting means for converting said binary modulating signal to an mBnB code sequence current where each of m and n represent a natural number, m being less than n; and frequency modulating means for frequency modulating said carrier signal by said mBnB code sequence current.

5. An optical communication system as claimed in claim 4, wherein $1 \leq m \leq 9$ and $2 \leq n \leq 10$.

6. An optical communication system as claimed in claim 4, wherein n is selected from (m+1) and (m+2).

7. An optical communication system as claimed in claim 4, wherein said frequency modulating means is for directly frequency modulating said carrier signal by said mBnB code sequence current.

8. An optical communication system as claimed in claim 4, wherein said frequency modulating means comprises:

means responsive to said mBnB code sequence current for superposing a distortion cancelling current on said mBnB code sequence current to produce a compensated modulating current, said distortion cancelling current having a waveform which said mBnB code sequence current has when passed through a low-pass filter; and means for directly frequency modulating said carrier signal by said compensated modulating current.

9. An optical communication system as claimed in claim 4, wherein said frequency modulating means comprises:

means responsive to said mBnB code sequence current for superposing a distortion cancelling current on said mBnB code sequence current to produce a compensated modulating current, said distortion cancelling current having a waveform which said mBnB code sequence current has when passed through a high-pass filter; and means for directly frequency modulating said carrier signal by said compensated modulating current.

10. An optical communication system comprising:
a transmitter,
a receiver,
and an optical path between said transmitter and said receiver, said transmitter comprising a laser for generating an optical carrier signal of a carrier frequency and modulating means for frequency modulating said carrier signal by an electrical modulating signal variable between a first and a second level into a modulated optical signal for transmission to said optical path, said receiver comprising a local optical source for generating a local optical signal of a local oscillation frequency predetermined in consideration of said carrier frequency, optical mixing means for mixing said local optical signal and the modulated optical signal received through said optical path to produce a mixed electrical signal, and demodulating means for demodulating said mixed electrical signal into a demodulated electrical signal representative of said electrical modulating signal, wherein said modulating means modulates said carrier signal with said electrical modulating signal to produce said modulated optical signal having a first and a second frequency in compliance with said first and second levels of said electrical modulating signals, said first and second frequencies having a frequency difference which is wider than a spectral width of said optical carrier signal, said mixing means mixing said local optical signal and said modulated optical signal to produce said mixed electrical signal having a first, lower and a second, higher frequency components corresponding to said first and said second frequencies, respectively, said demodulating means comprising first means for separating only one of said first and second frequency components from the mixed electrical signal and second means for demodulating only the one frequency component separated by said first means to produce said modulated electrical signal, said receiver not demodulating the other of said first and second frequency components.

11. An optical communication system as claimed in claim 10, wherein said laser comprises a semiconductor laser, said modulating signal comprises a binary modulating signal, wherein said modulating means comprises means for directly frequency modulating said carrier signal by said binary modulating signal.

12. An optical communication system as claimed in claim 10, wherein said laser comprises a semiconductor laser, said modulating signal comprises a binary modulating current, said modulated optical signal is an FSK modulated optical signal and said modulating means comprises:

means responsive to said binary modulating current for superposing a distortion cancelling current on said binary modulating current to produce a compensated modulating current, said distortion cancelling current having a waveform which said binary modulating current has when passed through a low-pass filter, said distortion cancelling current cancelling a distortion which would otherwise appear in said FSK modulated optical signal; and means for directly frequency modulating said carrier signal by said compensated modulating current.

13. An optical communication system as claimed in claim 10, wherein said laser comprises a semiconductor laser supplied with a d.c. bias, said modulating signal comprises a binary modulating signal, said modulated optical signal is an FSK modulated optical signal, and said modulating means comprises:

code converting means for converting said binary modulating signal to an mBnB code sequence current where each of m and n represent a natural number, m being less than n; and frequency modulating means for frequency modulating said carrier signal by said mBnB code sequence current.

14. An optical communication system as claimed in claim 13, wherein $1 \leq m \leq 9$ and $2 \leq n \leq 10$.

15. An optical communication system as claimed in claim 13, wherein n is selected from (m+1) and (m+2).

16. An optical communication system as claimed in claim 13, wherein said frequency modulating means is for directly frequency modulating said carrier signal by said mBnB code sequence current.

17. An optical communication system as claimed in claim 13, wherein said frequency modulating means comprises:

means responsive to said mBnB code sequence current for superposing a distortion cancelling current on said mBnB code sequence current to produce a compensated modulating current, said distortion cancelling current having a waveform which said mBnB code sequence current has when passed through a low-pass filter; and means for directly frequency modulating said carrier signal by said compensated modulating current.

18. An optical communication system as claimed in claim 13, wherein said frequency modulating means comprises:

means responsive to said mBnB code sequence current for superposing a distortion cancelling current on said mBnB code sequence current to produce a compensated modulating current, said distortion cancelling current having a waveform which said mBnB code sequence current has when passed through a high-pass filter; and means for directly frequency modulating said carrier signal by said compensated modulating current.

* * * * *